June 19, 1951          G. W. VITALE          2,557,583

GAME BOARD FOR SIMULATED NAVAL GAMES

Filed Sept. 12, 1947          2 Sheets-Sheet 1

INVENTOR.
Guy Wilson Vitale
BY
ATTORNEY

June 19, 1951            G. W. VITALE            2,557,583
GAME BOARD FOR SIMULATED NAVAL GAMES
Filed Sept. 12, 1947            2 Sheets-Sheet 2
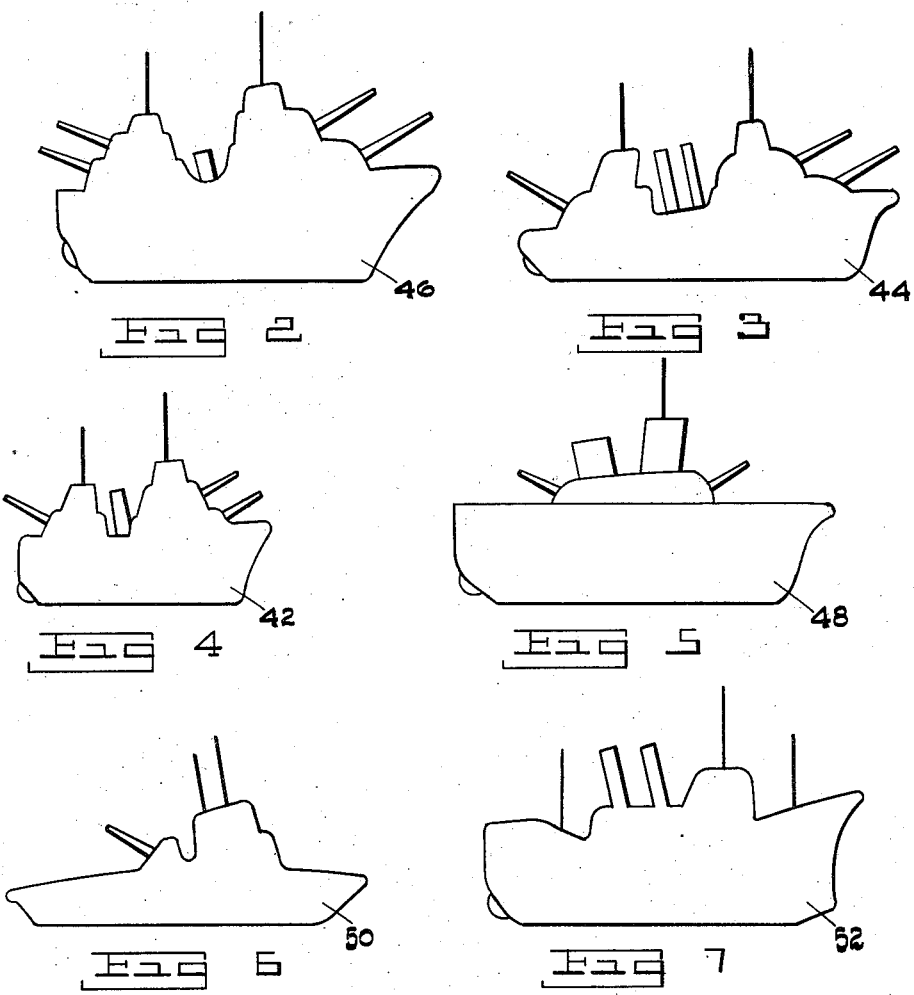
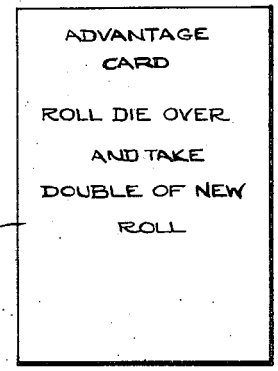
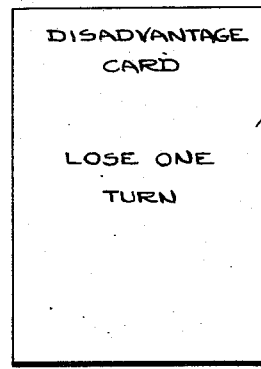
INVENTOR.
GUY WILSON VITALE
BY
ATTORNEY Patented June 19, 1951

2,557,583

UNITED STATES PATENT OFFICE 2,557,583

GAME BOARD FOR SIMULATED NAVAL GAMES

Guy Wilson Vitale, Gould City, Mich.

Application September 12, 1947, Serial No. 773,649

2 Claims. (Cl. 273—134)

This invention relates to games and more particularly to competitive educational games played on a game board simulating competitive war conditions.

Broadly the invention comprehends the provision of a game board and designated characters to be moved therein simulating naval warfare conditions between two naval forces, each force being of originally equal strength and the ability to be victorious depending on the maneuvering skill of the participants commanding the respective forces.

An object of the invention is the provision of an educational game simulating naval battle conditions, with regards to ships' firing power, vulnerability, and misfortunes that might befall the ships.

Another object of the invention is the provision of a game board representing a battle or war zone and designated characters to be moved therein representing opposing naval task forces bent on defeating each other in battle by successfully moving all surviving ships past and beyond the range of the opposing ships.

Another object of the invention is the provision of a game of maneuvering skill played upon a game board combining in manner the well known games of checkers and chess while at the same time simulating conditions relative to naval warfare.

A further object of the invention is the provision of a game board upon which designated characters or indicia are moved by a pair of competing players with the destination of each player being the successful moving of all surviving characters to locations adjacent the starting places of his opponent.

Other objects and advantages of the invention will appear from the following description taken in connection with the drawings, forming a part of the specification; and in which:

Fig. 2 is a side plan view of a game character representing a battleship;

Fig. 3 is a side plan view of a game character representing a cruiser;

Fig. 4 is a side plan view of a game character representing a destroyer;

Fig. 5 is a side plan view of a game character representing an aircraft carrier;

Fig. 6 is a side plan view of a game character representing a submarine;

Fig. 7 is a side plan view of a game character representing a tender;

Fig. 8 is a plan view representative of an advantage instruction card used;

Fig. 9 is a plan view representative of a disadvantage instruction card used.

Figure 1:
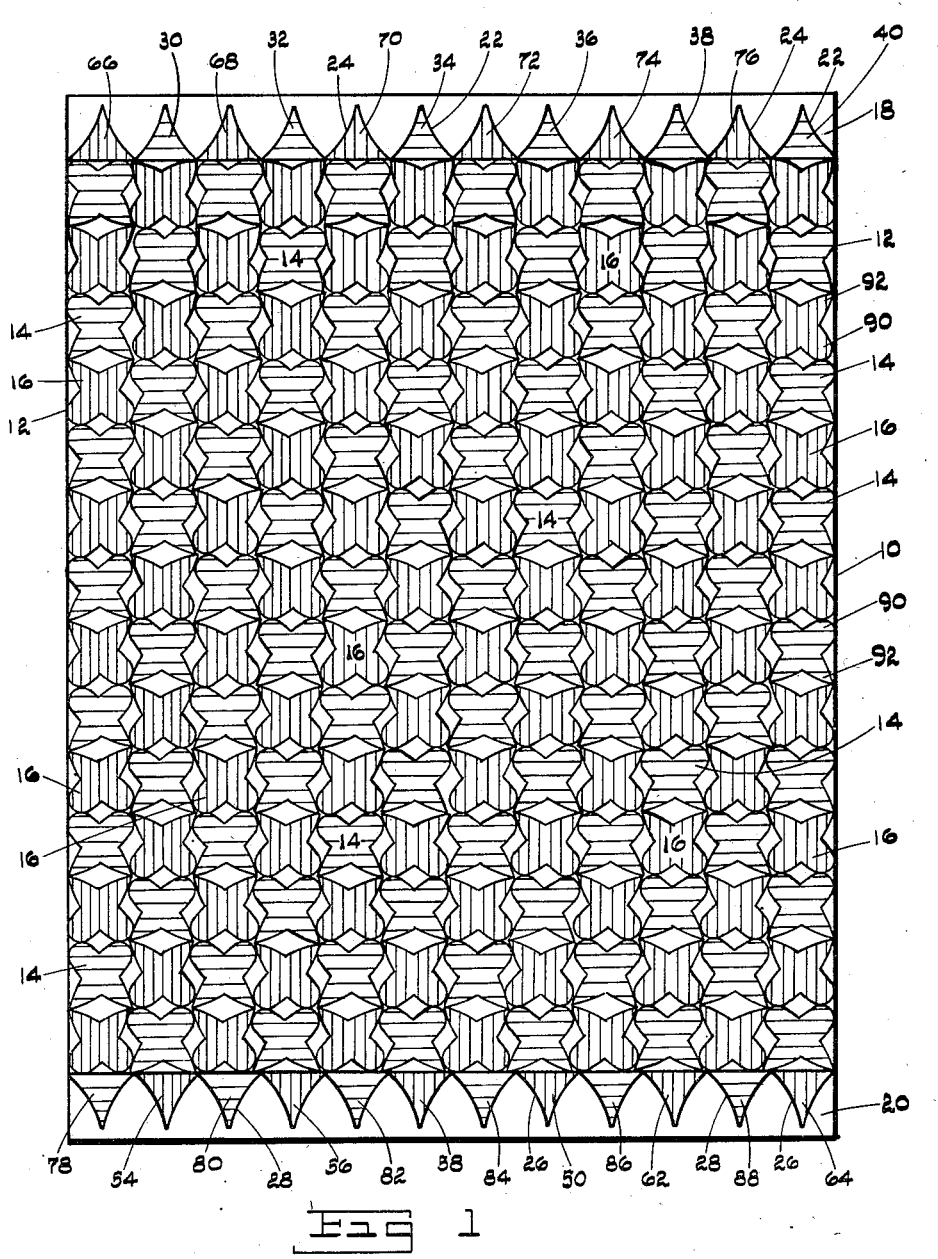
Fig. 1 is a top plan view of a game board illustrating the top plan silhouette of ships relative to the proper space and direction the ships are to be moved thereon.

The instant invention was devised for the purpose of providing a competitive educational game attempting in a small manner to simulate conditions of battle competition arising between naval forces when on ocean expanses and with no protection against one another other than firing power and invulnerability such as is the case of aircraft carriers and battleships each being generally invulnerable to attack by tenders, destroyers, and cruisers, yet they themselves when in offense having ample firing power to sink tenders, destroyers, cruisers, submarines, and each other.

The gist of the present invention is based on giving a series of designated ships including carrier, battleship, submarine, cruiser, destroyer, and tender a certain value comparable to their fighting or firing power; that is, for example, that a submarine on offensive can sink a tender, cruiser, carrier, and battleship, whereas on defense it is vulnerable to all ships except the tender, and, beginning from home port on the game board, maneuvering across the board, in keeping with a chance device manipulated by the player to escape the onslaughts of the opposing force, all his ships to their destination on the opposite extremity of the game board into designated berths adjacent the starting port berths of his opponent before his opponent reaches his designated destination with his ships.

In the course of moving and maneuvering the ships across the board and a ship or ships are sunk by opposing ships, it is necessary that said sunk ship or ships return to port and begin their journey anew. It is a requirement that all ships proceed in a forward direction unless sunk with the exception of the tender which is permitted to move in either direction upon its designated course which is determined from the starting point or port.

When certain predetermined chance numbers are obtained by the chance device, the player so obtaining said number draws an instruction card from a predesignated group and follows the instructions whether they be advantageous or disadvantageous. It is possible in certain instances that the instructions indicate the crippling of a ship in which case it is necessary that the tender reach said ship before it is permitted to proceed back into battle.

Referring to the drawings for more specific details of the invention, 10 represents generally a game board upon which the game of the invention is to be played comprising a plurality of spaces or stations 12 having the configuration of a pair of crossed top plan ship silhouettes. Two sets of silhouettes 14 and 16 are provided arranged in diagonal plan across the length and width of the game board, silhouettes 14 being defined by the lines thereon lying perpendicular to the length of the board and silhouettes 16 being defined by the lines thereon lying parallel to the length of the board wherein the ends of the board define generally ports 18 and 20 respectively.

The ports 18 comprise home or starting berths 22 for a set of ships to be later described adapted to be associated with silhouetted spaces or stations 14 and destination berths 24 for a second set of ships identical to the other set of ships adapted to be associated with silhouetted stations 16 whereas port 20 comprises home or starting berths 26 for the second set of ships associated with stations 16 and destination berths 28 for the other ships associated with stations 14. The stations 14 and 16 extend diagonally across the board such as to form diagonally straight, or criss-cross paths or routes of travel between the respective berths 22 and 28, and 24 and 26, said berths 22 and 28 having identical board length perpendicular marking as stations 14 and berths 24 and 26 having identical board length parallel marking as stations 16.

The home berths 22 comprise starting berths 30, 32, 34, 36, 38, and 40 respectively for ships 42, 44, 46, 48, 50, and 52 representing respectively destroyer, cruiser, battleship, aircraft carrier, submarine, and tender of one naval task force A; whereas the home berths 26 comprise starting berths 54, 56, 58, 60, 62, and 64 of a second naval task force B comprising ships identical in number, power, and designation to the other task force, said berths 54, 56, 58, 60, 62, and 64 respectively being the home berths of the destroyer, cruiser, battleship, aircraft carrier, submarine, and tender of task force B.

The destination berths 24 are nestled between the home berths 22 and comprise berths 66, 68, 70, 72, 74, and 76 respectively for the tender, submarine, aircraft carrier, battleship, cruiser, and destroyer of task force B; whereas destination berths 28 are nestled between the home berths 26 and comprise berths 78, 80, 82, 84, 86, and 88 respectively for the tender, submarine, aircraft carrier, battleship, cruiser, and destroyer of task force A.

It is to be noted that the stations 14 and 16 are so outlined that the curved portions 90 designate the stern and the pointed portions 92 designate the bow such that they point in the direction of motion the ships must follow; that is, in the direction from stern to bow.

It is preferably desired in the actual playing of the game that the associated stations, ports, and ships be of like distinguishing color and that the other associated stations, ports, and ships be of a like color differing from the other associated group.

For the purpose of identification in explaining the workings of the game, it shall be assumed that the ships of task force B bear the same numbers as the ships of task force A and differing therefrom solely in color.

The power of ships in the course of play is as follows:

| Name of ship | Can Sink on Offense | Can Sink on Defense |
| --- | --- | --- |
| Carrier | Tender Destroyer Cruiser Submarine Battleship | Tender Destroyer Cruiser |
| Battleship | Tender Destroyer Cruiser Carrier Submarine | Tender Destroyer Cruiser |
| Submarine | Tender Cruiser Carrier Battleship | Tender |
| Cruiser | Tender Destroyer Submarine | Tender |
| Destroyer | Tender Submarine | Tender |
| Tender | | |

A ship is considered on offense when it is on the move; whereas the one in opposing position when encountered in bow to bow position is on the defense.

The game is played by initially placing the opposing task forces A and B in their respective home or starting berths upon the gameboard wherein the tender 52 of task force A is placed upon the board in its home berth designated 40 and tender 52 of task force B is placed upon the board in its home berth designated 64 and so on through the remainder of ships in each task force being placed on the board in their proper berths. With the ships in starting position, the game is in readiness for educational competition between the two players, one commanding each fleet in task operation against the other fleet.

Figure 10:
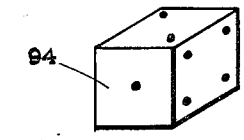
Fig. 10 is a perspective view representative of a die used in playing the game.

The movement of the ships upon and across the board is controlled by a suitable chance device, such as, a die 94 illustrated by Fig. 10 although it is at the option of the players as to the exact type of chance device to be used, whether it be a die, dice, a properly numerically designated spinner device, or playing cards. The normal progress of the game is for each player to move any one or more of his ships a given number of moves, spaces, or stations in accordance with the number obtained in rolling the die 94. In the course of rolling the die, if certain predetermined numbers are rolled the player does not move his ship or ships in accordance with said number but selects a card from a stack or pack of instruction cards provided, one predetermined number corresponding to a pack of advantage cards 96 and a second predetermined number corresponding to a pack of disadvantage instructions cards 98. The advantage cards provide various advantageous moves or instructions depending upon condition and location of the various ships of a fleet; whereas the disadvantage cards as illustrated by Fig. 9 indicate the crippling of a particular ship requiring the aid of the tender 52 before said ship can proceed in the game playing.

In the course of carrying out the playing of the game the following rules must be followed:

1. All ships must travel diagonally on the board and must not move back except in the case of the tender.

2. Ships must meet bow to bow in order for action or decisions to take place—excepting the carrier which has a radius.

3. The carrier 48 is the only ship having a radius of power, it being able to sink ships within a radius of one silhouette.

4. When a card calls for action on a ship which is not out to sea, disregard the card as enemy propaganda.

5. When two ships of the same class meet bow to bow, players must roll chance device 94 for decision—the highest man winning the battle.

6. When a ship reaches the finish line and is at the wrong port, player may zig-zag ship into the proper port on the finish line.

7. A ship may pass another ship within range without being sunk.

8. When a ship is sunk, it must return to port and start over.

9. The moves can be made on one ship or a number of ships with the same roll of the chance device.

10. The tender 52 has the least power of any of the ships on the board. Its only advantage is that it can travel in any direction on proper silhouettes. Due to the fact that this ship goes to the aid of other ships, it is the last ship off the board.

11. When a player removes his hand from a ship—it is considered a play and he cannot move back.

12. A ship which is crippled must be turned on its side and cannot be moved until the tender reaches the adjoining silhouette.

The object of the game is for each player to move his ships across the board in the prescribed stations and diagonally forward motion with the exception of the tender, which can be moved forward or backward, to their proper destination berths, the winner being the one who gets all his ships to their destination ports first.

The invention is to be limited only as indicated by the scope of the appended claims.

What I claim is:

1. A game board upon which opposing game pieces are adapted to be moved in opposite directions from starting berths to destination berths having markings thereon designating two sets of contrasting play stations arranged in transversely and longitudinally extended rows with the like stations forming diagonally arranged criss-cross playing areas extending across the game board, the play stations at each end of the game board being alternate in arrangement, two sets of contrasting starting berths, one set at each end of the board adjacent the end play stations, one berth for each like play station, and two sets of contrasting destination berths, one set at each end of the board alternately arranged between the starting berths adjacent the alternate end play stations, one destination berth for each like play station.

2. A naval battle simulating game board upon which opposing warships of varied power are adapted to be moved in accordance with the dictates of a chance device in opposite directions from starting to destination berths marked with two sets of contrasting play stations forming diagonally arranged criss-cross playing areas extending between parallel edges of the game board with the end stations arranged in line parallel to the edges of the board, said play stations having directional movement indicia thereon in the form of the crossed profiles of warships with the pointed or stern edge designating the forward motion or direction of motion the warships are to move thereon, two sets of contrasting starting berths, one set arranged at each end of the board in line arrangement adjacent the end play stations of like designation thereto, and two sets of contrasting destination berths, one set arranged on each end of the board alternately spaced between the starting berths adjacent the end play stations of like designation thereto.

GUY WILSON VITALE.

REFERENCES CITED

The following references are of record in the file of this patent:

UNITED STATES PATENTS

| Number | Name | Date |
|---|---|---|
| 1,373,286 | Wrisberg | Mar. 26, 1921 |
| 1,684,609 | Walker | Sept. 18, 1928 |
| 2,026,082 | Darrow | Dec. 31, 1935 |
| 2,211,297 | Bull | Aug. 13, 1940 |
| 2,277,301 | Channer | Mar. 24, 1942 |
| 2,342,899 | Sands | Feb. 29, 1944 |
| 2,414,165 | Paschal | Jan. 14, 1947 |

FOREIGN PATENTS

| Number | Country | Date |
|---|---|---|
| 2,521 | Great Britain | A. D. 1896 |